United States Patent [19]

Morrison

[11] Patent Number: 5,694,194

[45] Date of Patent: Dec. 2, 1997

[54] READILY SIZED EYEWEAR NAME CONSTRACTED FROM STANDARD-SIZED PARTS

[75] Inventor: James W. Morrison, Sarasota, Fla.

[73] Assignee: Morrison International, Inc., Sarasota, Fla.

[21] Appl. No.: 694,571

[22] Filed: Aug. 9, 1996

[51] Int. Cl.$^6$ .............. G02C 5/04; G02C 5/20; G02C 5/12; G02C 1/00

[52] U.S. Cl. .............. 351/128; 351/41; 351/118; 351/137

[58] Field of Search .............. 351/118, 119, 351/111, 116, 120, 121, 124, 126, 128, 129, 130, 131, 41, 137, 138, 136

[56] References Cited

U.S. PATENT DOCUMENTS

| | | |
|---|---|---|
| 1,750,630 | 3/1930 | Day . |
| 2,058,969 | 10/1936 | Fishman .............. 351/121 |
| 2,389,428 | 11/1945 | Glasser . |
| 2,721,498 | 10/1955 | Gerson . |
| 2,856,813 | 10/1958 | Kudelko . |
| 3,394,980 | 7/1968 | Dym . |
| 3,584,438 | 6/1971 | Lindblom . |
| 4,113,365 | 9/1978 | Koketsu . |
| 4,470,674 | 9/1984 | Piampiano . |
| 4,670,915 | 6/1987 | Evans . |
| 4,768,872 | 9/1988 | Fraselle et al. . |
| 4,792,221 | 12/1988 | Parks et al. . |
| 4,955,708 | 9/1990 | Kahaney . |
| 4,997,267 | 3/1991 | Morrison et al. . |
| 5,133,595 | 7/1992 | Gutbrod et al. . |
| 5,159,359 | 10/1992 | Pauly et al. . |
| 5,258,784 | 11/1993 | Baines . |
| 5,291,230 | 3/1994 | Bradley .............. 351/128 |
| 5,323,189 | 6/1994 | Contreras . |
| 5,347,325 | 9/1994 | Lei . |

*Primary Examiner*—Hung X. Dang
*Attorney, Agent, or Firm*—M Lukacher; K. Lukacher

[57] ABSTRACT

A custom-fitted economical eyeware frame constructed at the site of dispensing from a minimum inventory of parts includes lenses of predetermined size and power encompassed by appropriate eye wires, and a bridge assembly, temple end pieces and temple ear stems. Upon selection of an appropriate bridge assembly, any, or all, of the remaining parts may be individually adjusted to custom fit the individual's interpupillary distance requirement. The construction of the eyeglass frame may be readily accomplished by an eyewear professional at any location.

7 Claims, 6 Drawing Sheets

READILY SIZED EYEWEAR NAME CONSTRUCTED FROM STANDARD-SIZED PARTS

FIELD OF THE INVENTION

The present invention relates in general to eyeware frames and, in particular, an eyeglass or eyewear frame which is easily constructed from a small inventory of standard-sized corrective lenses, lens rims, bridges and temples. The constructed eyeglass frame positions the standard sized corrective lenses such that the individual's inter pupillary distance (IPD) requirements are easily and readily accommodated.

BACKGROUND OF THE INVENTION

In the fitting of eyeglasses to individual wearer's, it is an old and well known problem that eye care practitioners, such as opticians, must stock a substantial inventory of each style of frame being offered for sale. And within each individual style of frame being offered, it is necessary to stock various sizes of that frame to accommodate the various sizes and shapes of the wearer's heads. For example, some eyeglass wearer's have narrow heads, yet have a substantial IPD (interpupillary distance) while others have relatively wide heads with minimal IPD. Also, in order to properly position the corrective lenses before the eyes, some individuals may require that their eyeglasses sit high on their noses, while others require that their eyeglasses sit lower. Still further, many individuals require temples which may be longer than others in order to comfortably fit over their ears. Still further, for each style of frame, there exists any number of lenses of different shapes and sizes to fit the particular frame. And, as a further hindrance to economy and speed of dispensing, after an individual selects a frame, the lenses must be prepared by an appropriate optical laboratory such that the lenses fit the frame and IPD of the particular individual being fitted. Accordingly, the multiple combinations of eyeglass parts required to accommodate the variations in head sizes, IPD spacing, as well as the variations of eye and ear locations of each individual eyeglass wearer, result in an enormous frame inventory. Of course, the consequential cost for maintaining such an inventory is be passed on to the consumer. While the affluent may find the cost of purchasing such eyewear frames of no real consequence, it is a very real obstacle for a great number of people who have limited income, or who for a large number of reasons, are unable to afford such corrective eyewear. In many instances, people go without purchasing new eyeglasses solely because of the cost of purchasing new frames.

There have been numerous attempts in the prior art to solve the problems set forth above. Examples of such attempts my be seen in the following U.S. Pat. Nos.: 1,750,630; 2,389,428; 2,721,498; 2,856,813; 3,394,980; 3,584,438; 4,113,365; 4,470,674; 4,670,915; 4,768,872; 4,792,221; 4,995,708; 4,997,267; 5,133,595; 5,159,359; 5,258,784; 5,323,189; and 5,347,325.

The prior art eyeglass frames set forth above attempt to solve only some of the problems described, such as providing eyeglasses having bridges or temples which are adjustable. None of the known prior art referenced sets forth an eyeglass frame such as envisioned and set forth herein. Further, in many instances, the devices of the prior art incorporate the usage of small springs and/or clips which add to the cost of each eyeglass frame. Additionally, frames constructed utilizing such pieces are quite often very fragile. A further disadvantage is that each frame so constructed requires a substantial amount of hand labor, which, of course, adds to the final cost of the product.

In view of the numerous problems cited above, the inventor has developed an improved, economical eyewear frame comprising a minimum number of parts. The improved eyewear frame of the present invention may be readily and easily custom-fitted to a wide variety of individuals without the need for stocking a vast stock of individual frames and frame components corresponding to numerous frame sizes. Further, the eyewear frame of the present invention may be assembled and fitted to patients at any location without the need for special tools or elaborate fitting stations.

SUMMARY OF THE INVENTION

An object of present invention is to provide an improved eyewear frame which may be constructed from a small inventory of parts to fit a wide variety of individuals. Another object of the present invention is to provide an eyewear frame which may be assembled and custom fitted to an individual at any location. A further object of the present invention is to provide an improved eyewear frame with temple portions which are easily sized to length so as to properly, and comfortably, fit the patient. The improved eyewear frame of the present invention is further provided with temple end portions which are adjustable to alter the effective size of the frame. Still further, the improved eyewear frame of the present invention, provides an adjustable bridge member which may be positioned vertically on the frame at any of several positions to accommodate the varying nose sizes and shapes of potential eyeglass wearers and to further, accommodate the individual's particular IPD requirements.

The foregoing and other objects, features and advantages of the invention will become more apparent from reading the following detailed description of the preferred embodiment, with particular reference to the accompanying drawings.

DETAILED DESCRIPTION OF THE INVENTION

Figure 1:
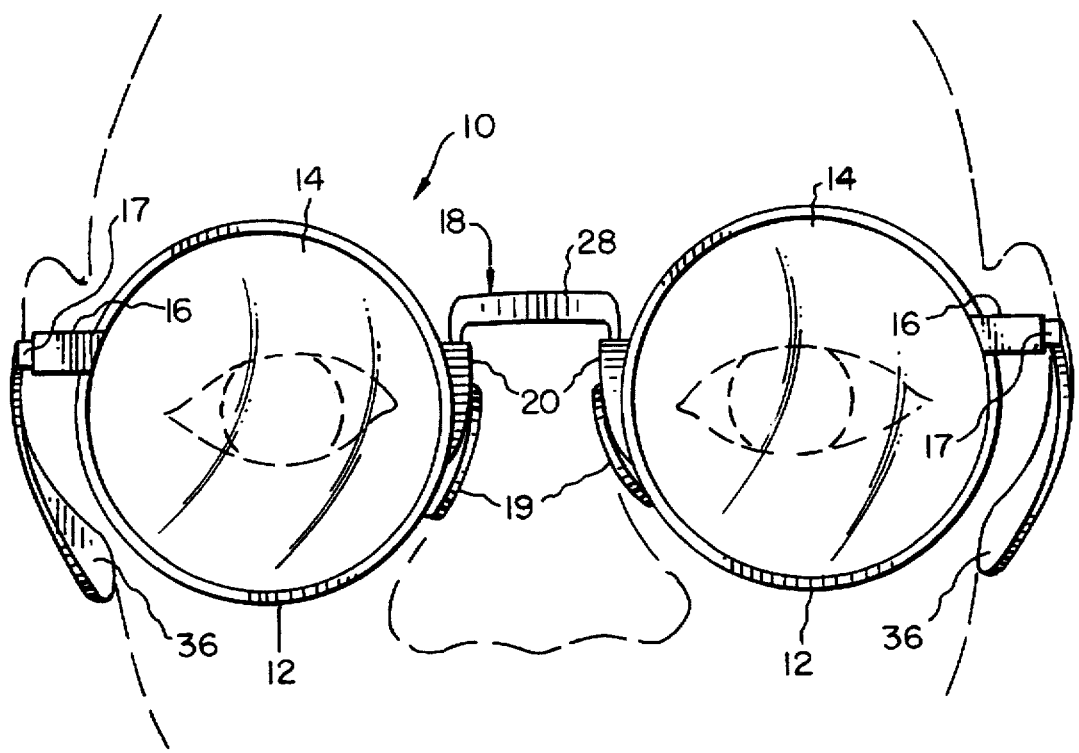
FIG. 1 is a front view of an eyewear frame according to the principals of the invention.

As illustrated in FIG. 1, the eyewear frame 10 of the present invention comprises a pair of standard-sized rim portions 12 which encircle and contain corrective lenses 14. Eyewear frame 10 includes temple end portions 16 having adjustable temple ends 17 connected thereto. Further, frame 10 includes a bridge assembly 18 having nose pads 19 interconnected between said rim portions 12.

Rim portions 12, preferably, are constructed from a plastic material, such as "Grillon", a polyamide material that has excellent mechanical and aesthetic properties, and which can be molded for economy. However, rim portions 12 may be constructed from any other material well known to those skilled in the eyewear business. Temple end portions 16 are preferably constructed integrally with rim portions 12 but, may be formed of separate pieces and secured, such as by welding, to rim portions 12. Bridge assembly 18 is preferably formed from a material such as nickel-silver of at least 18% nickel content so as to present a strong interconnection between the two rim portions 12. However, bridge assembly 18 alternately, may be formed from a plastic material which offers substantially strength and flexibility, such as the polyamide material, previously described.

Figure 2:
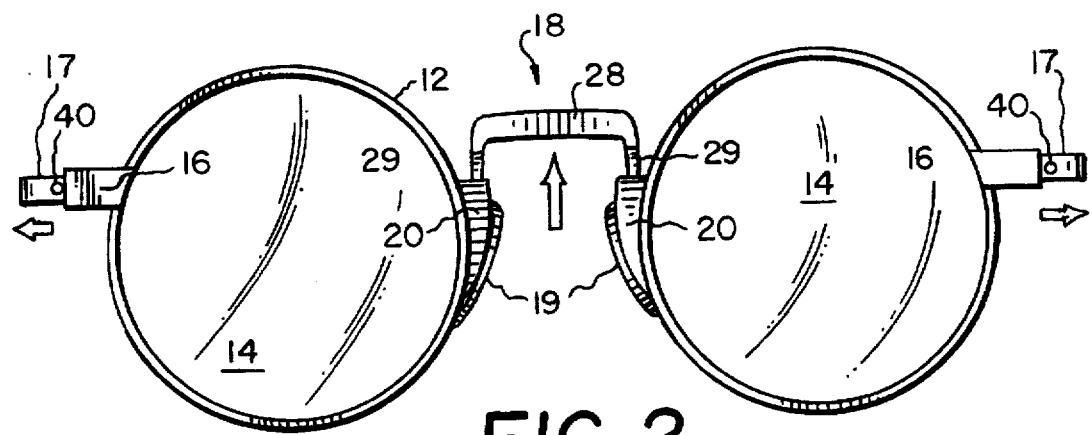
FIG. 2 is a view similar to FIG. 1 wherein both the bridge and the temple ends are adjusted to alternate positions.

By referring to FIGS. 1 and 2, it will be seen that bridge assembly 18 is vertically adjustable while temples 17 are longitudinally extensible from temple end portions 16.

Figure 3:
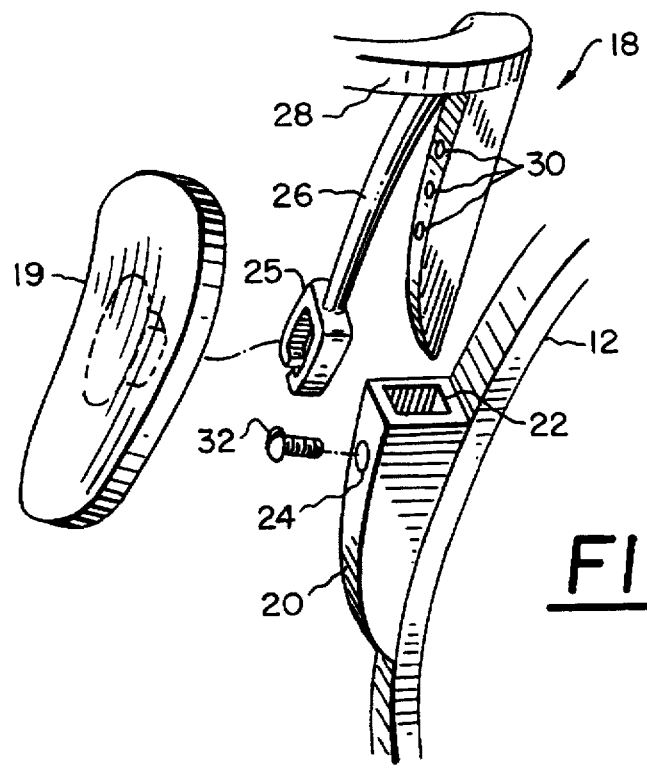
FIG. 3 is an enlarged, exploded partial perspective view of the nosepiece adjusting mechanism according to the invention.
Figure 4:
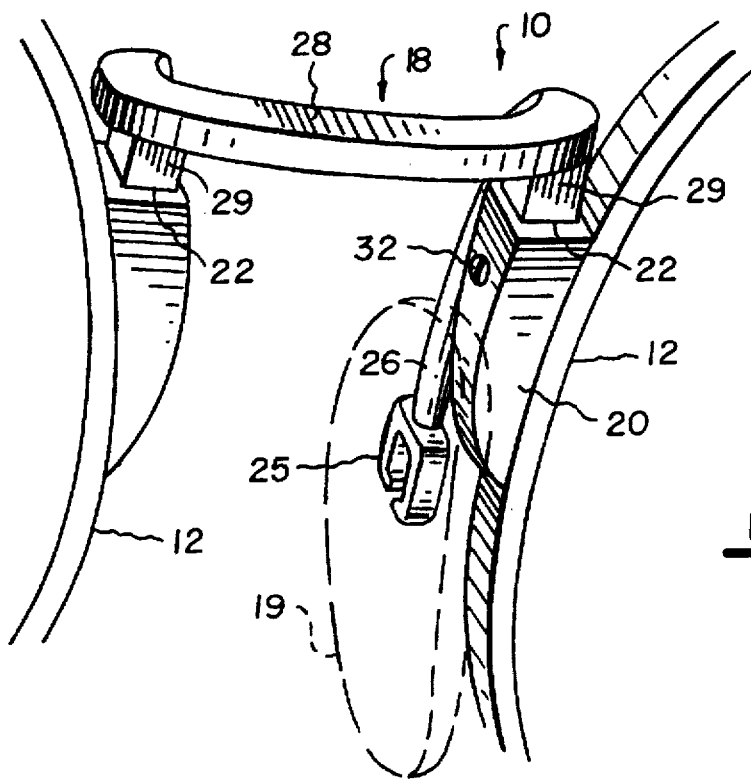
FIGS. 4 and 5 are views similar to FIG. 3 wherein the nosepiece is assembled to the frame in alternate positions.
Figure 5:
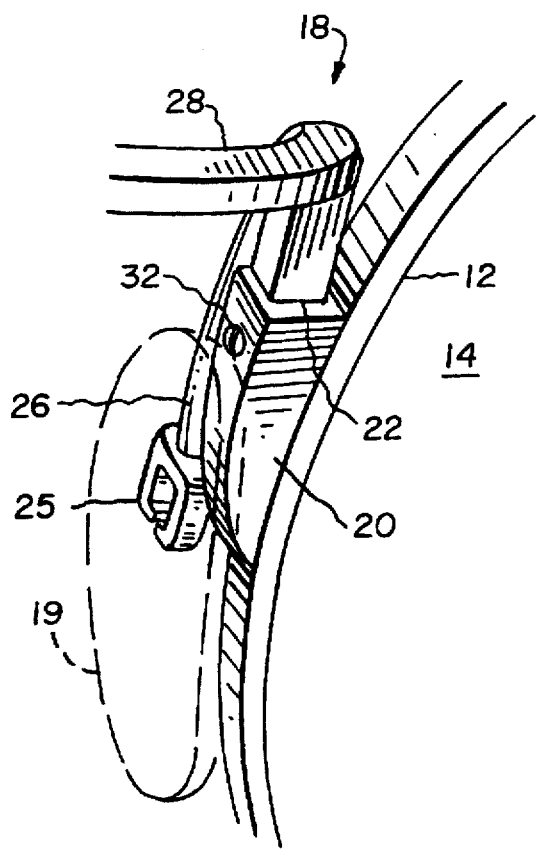
Figure 6:
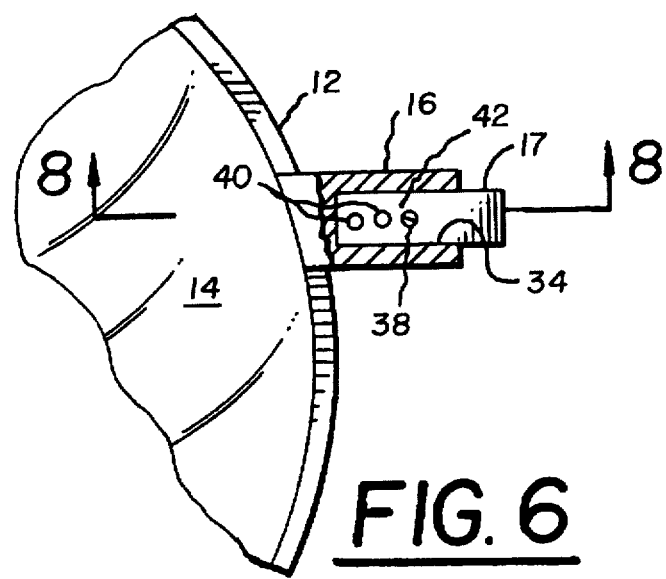
FIGS. 6 and 7 are enlarged, partially sectioned front views showing the temple ends in alternate positions.

Referring to FIGS. 3–5, the vertical adjustment of bridge assembly 18 will be more fully described and, therefore, understood. Herein, each rim portion 12 includes a socket 20 appropriately formed on or affixed thereto. Socket 20 includes a vertical bore 22. An aperture 24 is formed through socket 20 to bore 22. While, for convenience of illustration it is shown that aperture 24 is formed through the side of socket 20 to bore 22, it may just as easily be formed through either the front or, preferably through the rear.

Bridge assembly 18 includes nose pads 19 which are attached, such as by clamping fingers 25, to and depend from flexible pad arms 26 fixed to connecting bridge 28. Bridge assembly 18 further includes a pair of bayonets 29 which also depend from connecting bridge 28. Bayonets 29 are appropriately sized to be received within vertical bore 22 of socket 20. Each bayonet 28 includes a plurality of height adjusting apertures 30 which may be threaded. A securing pin 32, which may be a threaded screw, is sized to fit through aperture 24 and into any one of the plurality of adjustment holes 30, which also may be threaded.

Figure 7:
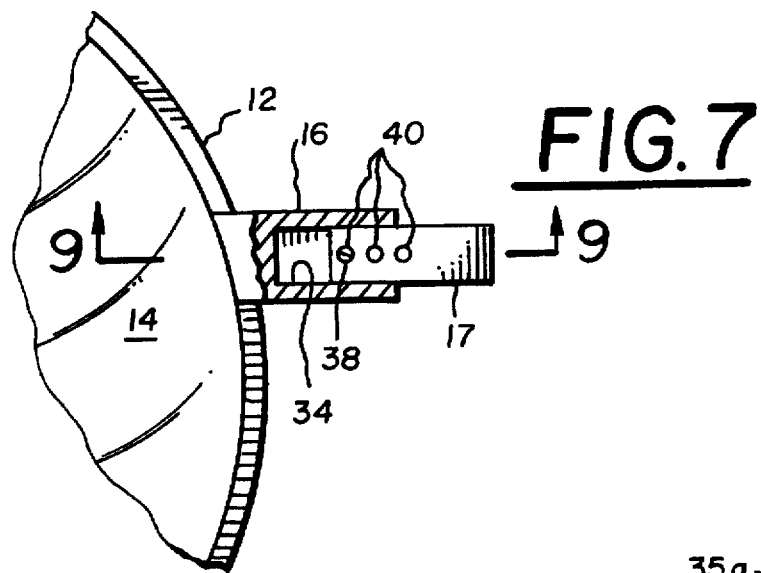
Figure 8:
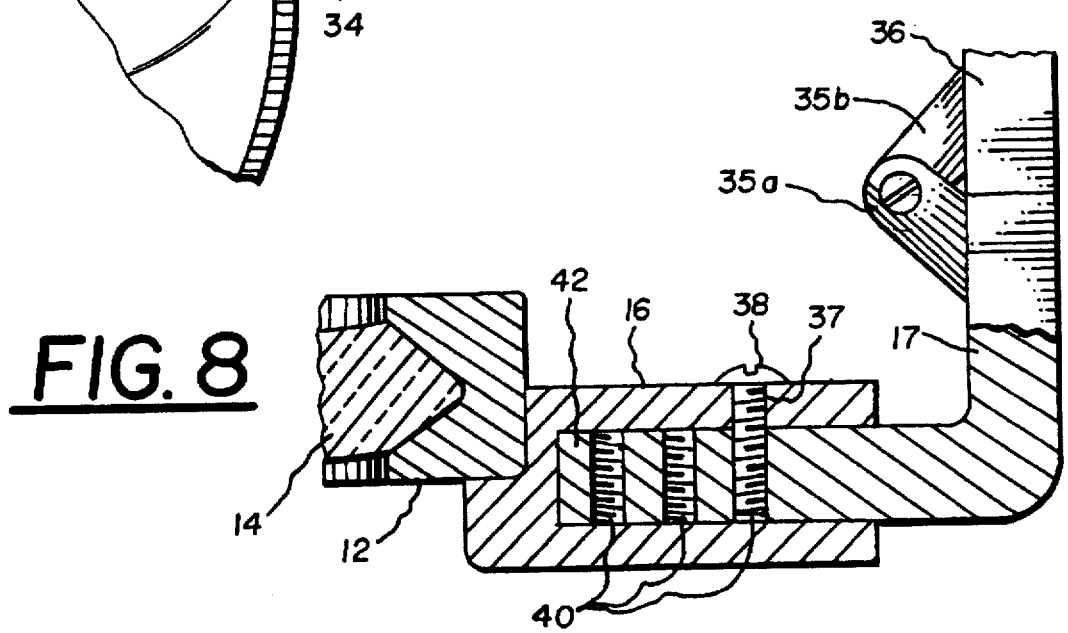
FIG. 8 is an enlarged sectional view taken along line 8—8 of FIG. 6.
Figure 9:
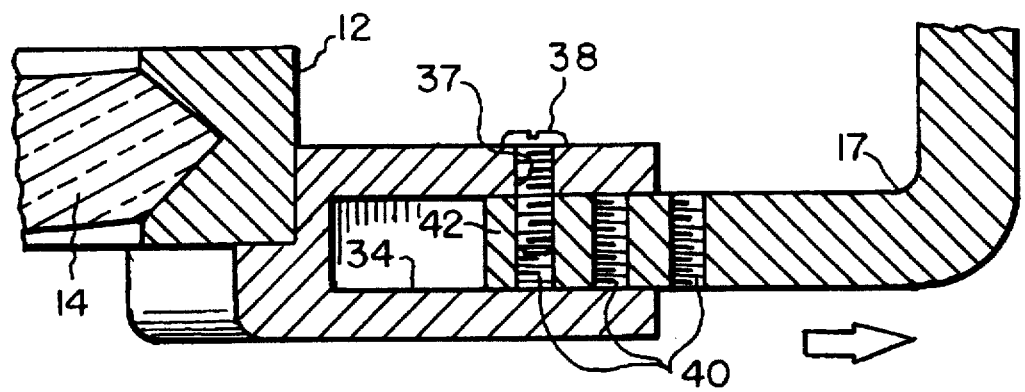
FIG. 9 is an enlarged sectional view taken along line 9—9 of FIG. 7.

In reference now to FIGS. 6–9, the longitudinal adjustment of temple ends 17 within temple end portions 16 will be described. Herein, adjustable temple ends 17 are sized so as to be slidably received within a socket, or slot 34, formed within temple end portions 11. Temple ends 16 further include hinge members 35a connecting to hinge member 35b of temple ear stems 36. An aperture 37, as best illustrated in FIGS. 8 and 9, is formed through the rear walls of temple end portion 16 to slot 34 thereof. A screw 38 is fitted through aperture 34 into any one of a plurality of threaded apertures 40 formed adjacent the end 42 of temple 17. Of course, aperture 37 could be formed through the front wall of temple end portion 16 and screw 38 could include an escutcheon so as to add a touch of decoration.

Figure 10:
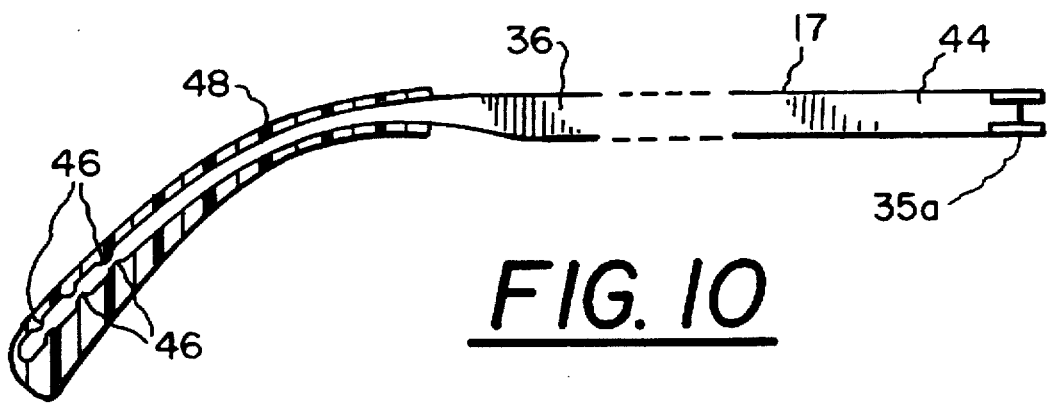
FIG. 10 is a sectional view of adjustable temple ear stem according to the present invention.

Referring now to FIG. 10, temple ear stems 36 will be described. Herein, stems 36 comprise an elongate member 44, preferably formed of a nickel-silver material as previously described, although other materials such as stainless steel would work as well. One end of ear stem 36 includes a hinge member 35b for mating with hinge member 35a of temple end portions 17. A plurality of indicator notches 46 are formed adjacent the opposite end of elongate member 44. Notches 46 are positioned along member 44 at select positions which relate to the known lengths of temple ear stems corresponding to the vast majority of patients being fitted. A covering 48 formed of an appropriately durable, yet soft and pliable, material such as cellulose propionate is fitted over the end of elongate member 44 having notches 46.

Having described the component parts of my new improved eyewear frame 10, the procedure for constructing a custom-sized eyewear frame from such component parts now will be fully set forth.

Herein, an eyewear professional, such as an optician or optometrist may operate out of an ordinary office in a metropolitan area one day and the next day may pack a relatively small number of standard sized corrective lenses and eyewear frame parts according to the present invention into an easily managed and transportable show case and drive, or otherwise, move his or her office to the patient rather than vise-versa. This is especially significant for practitioners to consider when trying to dispense proper eye care and corrective eyewear to people who may reside in remote areas, or who perhaps are located in an area devoid of eye care practitioners or, for example, may be residents of proprietary care centers who cannot leave the facility. Accordingly, once the practitioner has arrived at the desired area, which as referenced earlier may be a regular office location or a remote location, a patient will be reviewed and certain parameters considered in order to properly fit the improved eyewear frame according to the invention. A frame 10 will be quickly assembled from the component parts, e.g., lenses 14 rims 12 including temple ends portions 16, temple 17, and bridge assembly 18.

The first and most controlling thing the practitioner will consider is the spacing between the pupils (IPD) of the patient being fitted. As all of the lenses 14 envisioned by the frame of the present invention are of a single standard size upon which corrective power is ground on-center, it is necessary to center the lenses with respect to the patient's eyes. That is, lenses 14 must be positioned on the patient such that the center of each lens is placed approximately before the center of each eye. Accordingly, as all of the rim portions 12 are also of a single standard size to accommodate lenses 14, a way must be found to properly center the lenses on the patient. This is accomplished by providing bridge assembly 18 in several sizes of varying widths. It is easily seen that a wide bridge assembly 18 interconnected between a pair of standard sized rim portions 12, will space the corrective lenses 14 farther apart than will a narrow bridge assembly. Therefore, once the patient's IPD spacing is determined and an appropriately sized bridge assembly is selected, the practitioner will determine whether to either extend or retract temple ends 17 from temple end portion 16 in order to have the frame 10 properly fit the patient's face.

For example, if the patient being fitted has a large head, temple ends 17 would be set to their outer limits in temple end portions 16 by merely positioning them in slot 34 such that screw 38 may coupled to the aperture 40 closest to end 42 of temple end 17. This position is best seen in FIGS. 7 and 9. In the extended position, temple ends 17, which include temple ear stems 36, are as widely separated from frame 10 as possible.

Thereafter, the practitioner would consider the proper fitting of the bridge assembly 18 to the patient's nose. For example, if it is determined that bridge assembly 18 must fit low on the patients's nose in order to properly fit, as seen in FIG. 1, it is only necessary to fit bayonet portion 29 into bore 22 of socket 20 disposed on rim 12 such that screw 32 is fitted through aperture 24 and threaded into the aperture 30 which is the closest to the connecting bridge 28. Accordingly, such an adjustment will place the nose pads 19, which depend from pad arms 26, as shown in FIGS. 1 and 4. This placement is desired for fitting bridge assembly 18 low on the patients face. Thereafter, pad arms 26 may be individually adjusted to properly position nose pads 19 on the patient's nose.

With frame 10 now having the correct spacing for temple ends 17 and bridge assembly 18, it is only necessary for the practitioner to determine the correct length of temple 17 to properly fit the patient's head. This is simply determined by measuring the distance from the patient's ear to frame 10 as it would be positioned on the patient's face. Once the length is known, the practitioner would merely take one of the elongate members 44 or temple 17 and, using the measurement referenced above, cut the elongate member 44 at the desired indicator notch 46 which corresponds to that specific length. The soft pliable cover 48 is then fitted over the cut portion of member 44. Thereafter, as best seen in FIG. 10, elongate members 44 and fitted pliable cover 48 are bent so as to comfortably contour to the patient's ear.

The above is given by way of example for positioning the eyewear frame 10 of the present invention to a person having a large head requiring glasses to fit low on the nose. Obviously, should it be necessary to fit a patient having a narrow face requiring a high bridge it is only necessary to arrange temple end 17 and bridge assembly to accommodate in the fashion just described.

Figure 11:
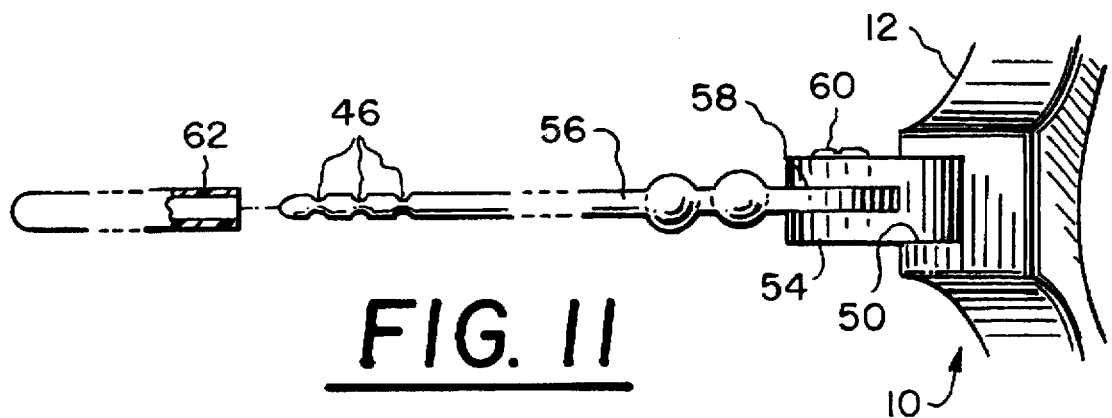
FIG. 11 is an exploded view of a further embodiment of an adjustable temple ear stem according to the invention.
Figure 12:
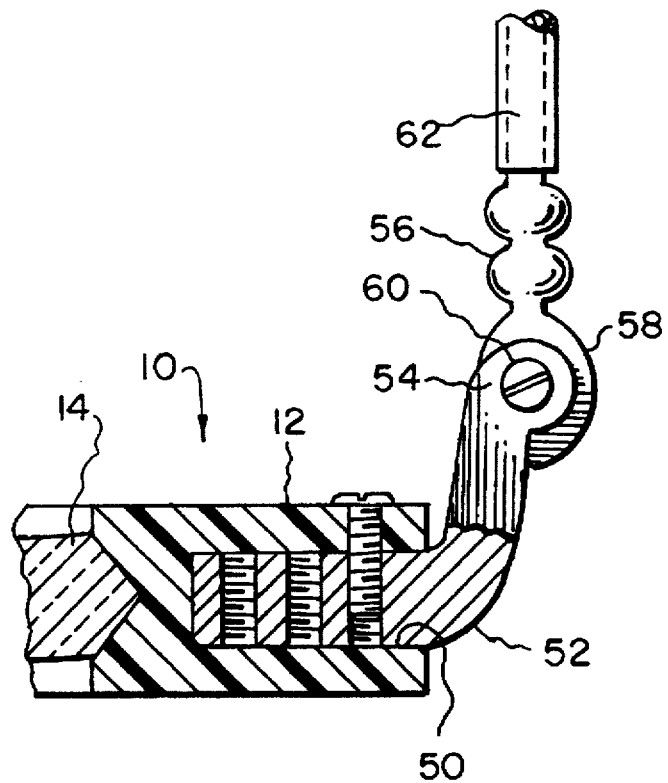
FIG. 12 is an enlarged, partially sectioned view of the temple ear stem shown in FIG. 11 assembled to a further embodiment of the temple ends shown in the previous views.

A further embodiment of the present invention is shown in FIGS. 11 and 12. Herein frame 10 includes a slot 50 for receiving a temple end 52 which includes an integrally formed hinge portion 54. A temple ear stem 56 having an integrally formed hinge portion 58 is coupled by way of hinge screw 60 to hinge portion 54, as seen in FIG. 12. A pliable, soft sleeve 62 is disposed over ear stem 56. The required fitting procedure for this embodiment is exactly the same as that described for the previous embodiment.

From the foregoing, it will be appreciated that an improved eyeglass frame has been provided, and, particularly, an eyeglass frame which may be readily assembled at any location from a minimum number of component parts to custom fit the eyeglass frame to the patient. Many variations and modifications to the eyeglass frame described herein will become apparent to those skilled in the art upon a thorough reading of the present text. Therefore, the foregoing is meant to be taken as illustrative only, and in no way as limiting.

It is claimed:

1. An economical eyewear frame constructed of component parts at the site of fitting, comprising:
    a) first and second lens rims, each of which includes a temple end receiving portion and a bridge assembly receiving portion;
    b) a bridge assembly having a pair of nose pads disposed thereon, said bridge assembly further including means thereon for providing adjustable engagement with said bridge receiving portion of said first and second lens rims for providing vertical adjustment of said bridge assembly with respect thereto; and
    c) a temple end piece having a hinge formed thereon for coupling to a temple ear stem, said temple end receiving portion including a horizontal socket having an aperture formed therein, and said temple end piece includes a plurality of apertures, at least one of which aligns with said aperture in said socket when said temple end piece is coupled thereto, and said eyeglass frame further including means coupled between said socket aperture and at least one of said temple end piece apertures for positioning said temple end piece with respect to said temple receiving portion.

2. An eyeglass frame according to claim 1 wherein said bridge receiving portion comprises a vertical socket having an aperture, and said means on said bridge assembly for providing vertical adjustment comprises a member having a plurality of apertures, said member being compatibly shaped for coupling within said vertical socket in said bridge receiving portion such that at least one of said plurality of apertures thereof aligns with said vertical socket aperture, and further including mens coupled between said vertical socket aperture and at least one of said plurality of apertures in said member for providing vertical adjustment of said bridge assembly with respect to said lens rims.

3. An eyewear frame according to claim 1 wherein said aperture provided in said horizontal socket is formed through the rear wall thereof.

4. An eyewear frame according to claim 1, wherein said bridge assembly includes a connecting bridge having a pair of depending pad arms fixed thereto and said nose pads are attached thereto.

5. An eyewear frame constructed of component parts at the site of fitting, comprising:
    a) first and second lens rims, each of which includes a temple end receiving portion and a bridge assembly receiving portion;
    b) a bridge assembly having a pair of nose pads disposed thereon, said bridge assembly further including means thereon for providing adjustable engagement with said bridge receiving portion of said first and second lens rims for proving vertical adjustment of said bridge assembly with respect thereto;
    c) a temple end piece having a hinge formed thereon for coupling to a temple ear stem, said temple end piece including means thereon for providing adjustable engagement with said temple end receiving portion to provide lateral adjustment thereof; and
    d) a temple ear stem coupled to said hinge formed on said temple end piece, said temple ear stem including indicator means formed thereon for determining and providing the appropriate length to said temple ear stem to a patient being fitted.

6. An eyewear frame according to claim 5 wherein said indicator means on said temple ear stem comprise of a plurality of notches each of which corresponds to an ear stem length known to correspond to a group of patients being fitted.

7. An eyewear frame according to claim 6 wherein said temple ear stem includes a soft, pliable cover fitted thereto after cutting said temple ear stem at one of said indicator notches.

* * * * *